Sept. 20, 1966  P. P. MORISON  3,274,377
INTEGRATED ERROR CORRECTING SYSTEMS

Filed Aug. 14, 1962  6 Sheets-Sheet 1

INVENTOR:
PETER P. MORISON
BY
Browne, Schuyler & Beveridge
ATTORNEYS

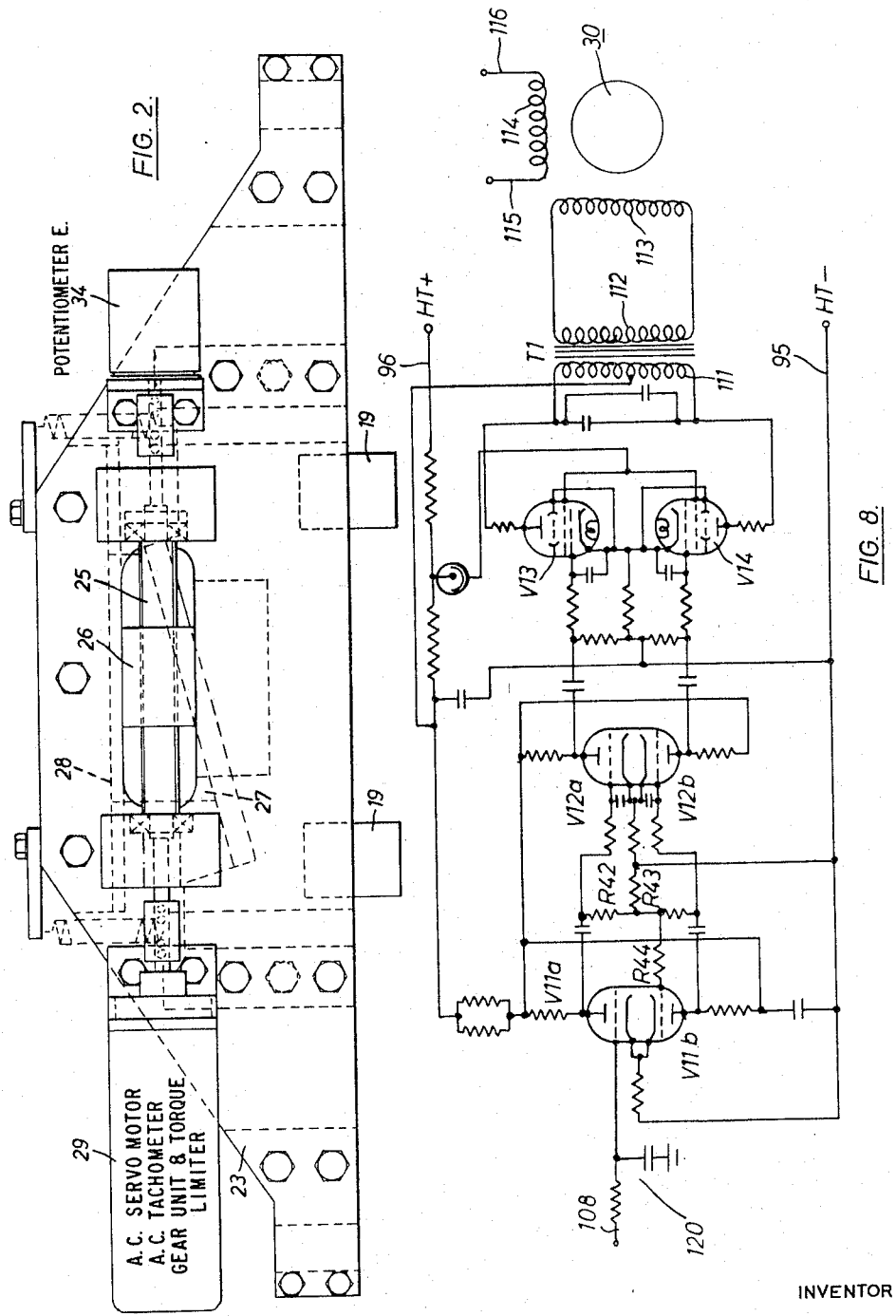

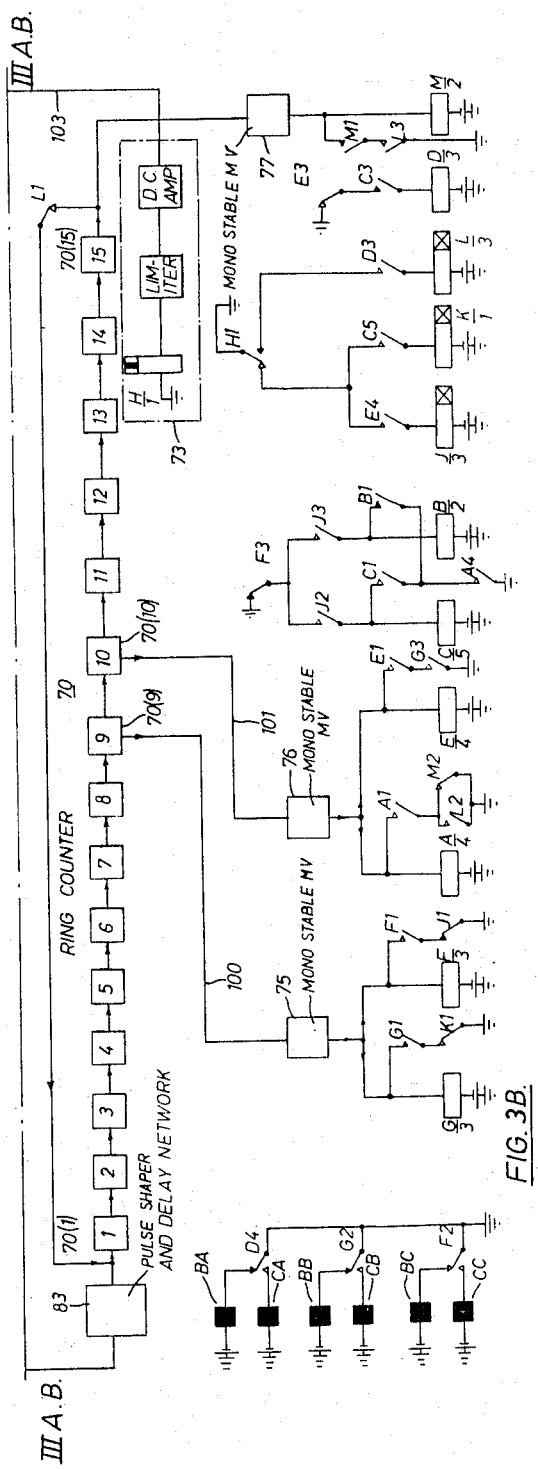

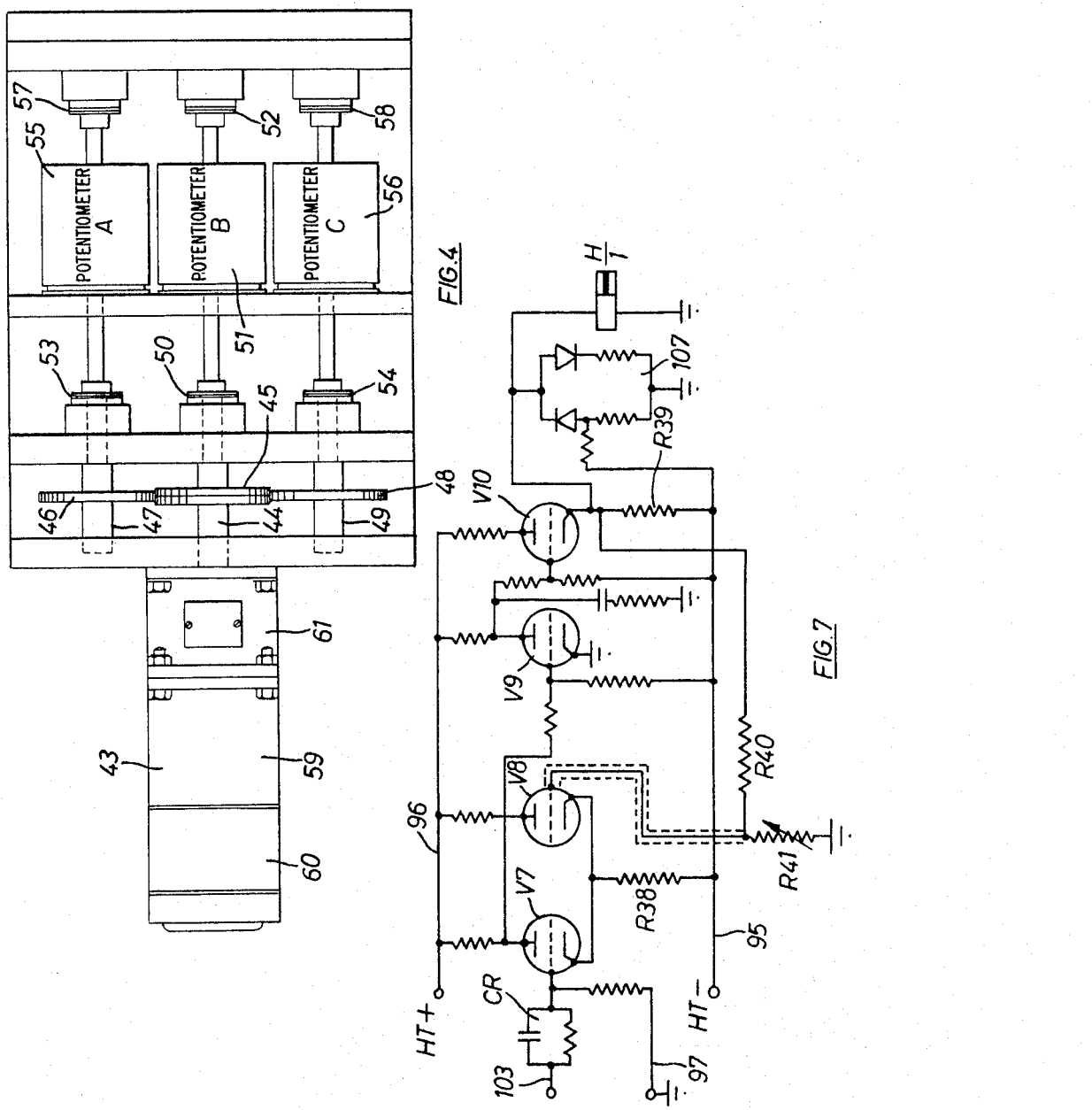

Sept. 20, 1966   P. P. MORISON   3,274,377
INTEGRATED ERROR CORRECTING SYSTEMS
Filed Aug. 14, 1962   6 Sheets-Sheet 6

INVENTOR:
PETER P. MORISON
BY
Browne, Schuyler
& Beveridge
ATTORNEYS

United States Patent Office 3,274,377
Patented Sept. 20, 1966

3,274,377
INTEGRATED ERROR CORRECTING SYSTEMS
Peter P. Morison, Cambridge, England, assignor to Spillers Limited, a British company
Filed Aug. 14, 1962, Ser. No. 216,823
Claims priority, application Great Britain, Aug. 17, 1961, 29,669/61
21 Claims. (Cl. 235—151.13)

The present invention relates to a system for integrating or summating a predetermined number of error signals, and controlling an error correcting mechanism.

In certain manufacturing processes where a material or substance in bulk is divided into a plurality of discrete units or packages, each of a predetermined desired magnitude, conditions may be such that random variations in the magnitude of each discrete unit or package may be present and that it is not desirable for corrections to the adjustment of the dividing appartus to be made as a result of a variation in the magnitude of a single unit or package. In such circumstances it is desirable that corrections to the adjustment should be initiated by the average error over a predetermined number of units or packages. One such process where such conditions obtain is in the baking industry and arises in connection with the dividing of dough into dough pieces for subsequent processing and baking to produce loaves of bread.

According to the present invention an error correcting system comprises integrating means responsive to a predetermined number of successive error signals each indicative of the degree and direction of departure of a selected characteristic of a unit or package from a predetermined desired value and providing an integrated output signal determined by the sum of said error signals, a servo mechanism responsive to said output for driving a storage means and a servo mechanism responsive to said storage means for effecting an error correcting adjustment.

Whilst the characteristic of each unit or package may be a dimension or a colour or an assessment of quality, in a preferred arrangement it is the weight, and the system preferably includes weighing means for weighing individual units or packages in succession and for delivering an error signal indicative of any departure of the weight of an individual unit from a desired and predetermined weight. In applying the system to the dividing of dough into pieces, it is not possible to assess the weight of each dough piece immediately as it is produced in a dough divider and it is necessary to weigh each dough piece at a station located later in the path of travel of dough pieces after leaving the dough divider. A most convenient location for weighing the dough pieces is after a hander-up, on to which dough pieces are conveyed from the divider. It is, therefore, advisable that when the servo mechanism effects any correcting adjustment to the dough divider, the integrating means should not take into account any error signals derived from dough pieces which had left the dough divider prior to the correction being effected, but should only be responsive to a group of error signals commencing with the first dough pieces delivered by the dough divider after correcting adjustment. This may readily be achieved by providing ring counting means responsive to the passage of dough pieces at a predetermined point, preferably a little prior to the weighing station.

As there is, at the present time in Great Britain, a statutory requirement that no loaf at the point of sale should weigh less than a legally specified weight, the system preferably includes means for rejecting or segregating any dough pieces which are below a desired weight.

Hitherto in many cases the problem of producing loaves of bread each of specified weight has been solved mainly by manually weighing at frequent intervals dough pieces delivered by the divider to the hander-up and by adjusting the setting of the dough divider accordingly. The weight of the dough pieces bears an arbitrary relationship to the desired value of the weight of the finished loaf in order to compensate for losses in weight in processing following dividing. A difficulty arises from the fact that a dough divider is essentially a volumetric device and not a weight device and that changes in the setting of the dough divider produces a change in the volume of a dough piece rather than essentially in its weight. It is found, in practice, that there are always variations in the form of scatter on either side of the mean weight of loaves and as it is a statutory requirement that no loaf should be underweight, it is conventional to adjust a dough divider so that variations in operation of the dough divider are such that even a dough piece at the lower limit of scatter will be of sufficient weight. By weighing all dough pieces and automatically segregating dough pieces which are under a predetermined weight, it is possible for the dough divider to be adjusted to give a slightly lower mean weight and for underweight dough pieces to be returned to the dough divider for reprocessing and the excess dough which is at present permitted in dough pieces in order to ensure that no loaf is below the prescribed weight, can be materially reduced, thereby enabling greater uniformity to be obtained in the weight of finished loaves.

The invention will be further described by way of example with reference to the accompanying drawings which illustrate one embodiment thereof as applied to stabilization of weights of dough pieces, and in which:

FIG. 2 is a detail plan view of the dough divider adjusting mechanism to an enlarged scale;

FIG. 4 is a diagrammatic plan view of storage means and servo mechanism;

FIG. 7 is a circuit diagram of a steady state detection amplifier, and

FIG. 8 is a circuit diagram of the A.C. servo amplifier of FIG. 3.

Figure 1:
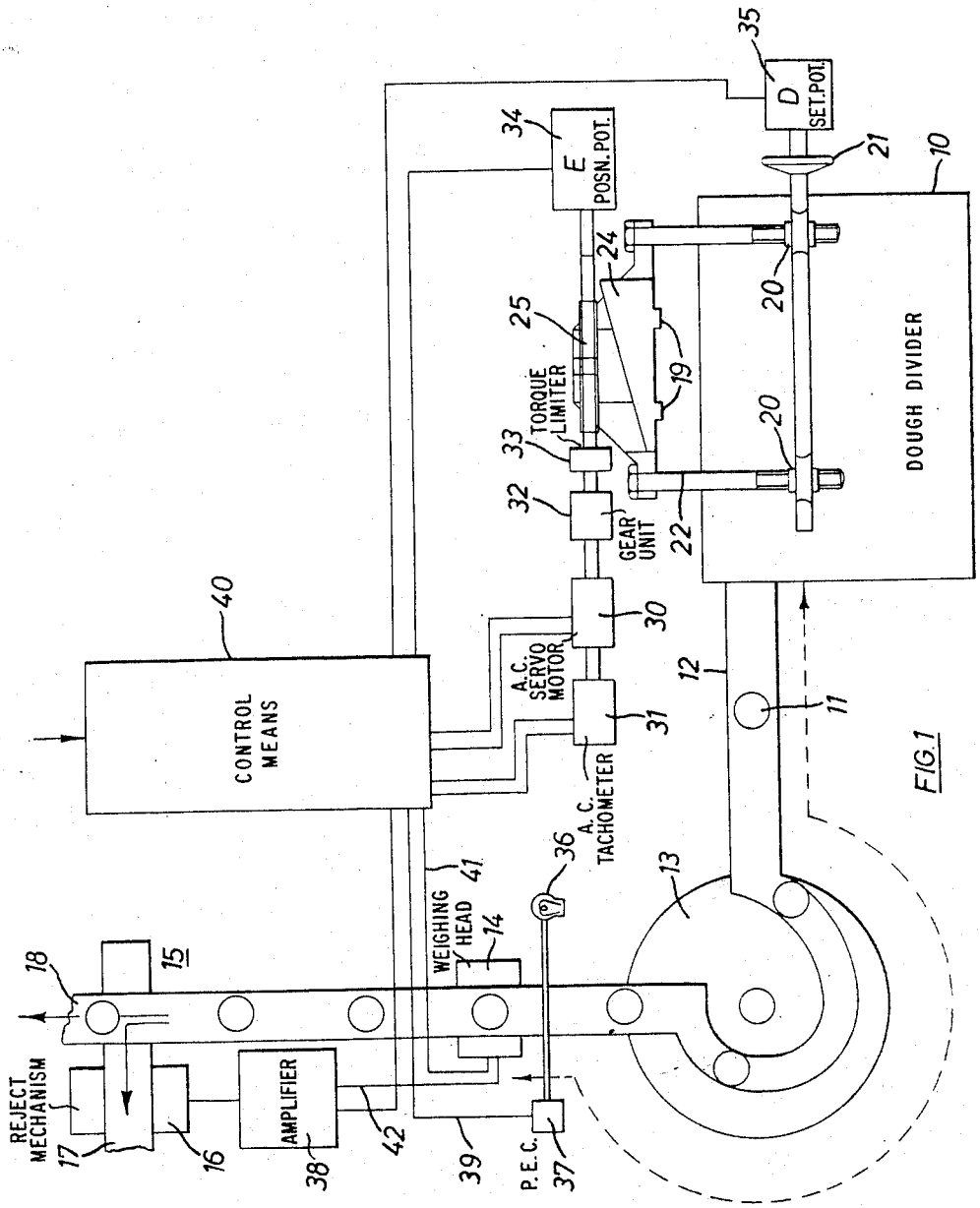
FIG. 1 is a diagrammatic plan view of part of a dough divider, a hander-up, a dough piece weighing station and underweight reject station.

Referring initially to FIGS. 1 and 2 a dough divider indicated generally at 10 divides dough in bulk volumetrically into a plurality of dough pieces 11 and delivers them on to a conveyor 12 feeding them to a hander-up 13. On leaving the hander-up they pass to a weighing head 14 and then through an underweight reject station 15. Dough pieces underweight are diverted by reject mechanism 16 on to a conveyor 17 for return to the dough divider whilst dough pieces, whose weight is satisfactory, continue along conveyor 18 for subsequent processing.

In the dough divider in a well known manner the volume of dough in each dough piece is determined by the position of a pair of stops 19 and the position of the stops is determined primarily by a worm and worm wheel operated screw and nut mechanism 20 manually operable by means of a hand wheel 21. The dough divider is preferably provided with an additional adjusting mechanism, as disclosed in our United States patent application Serial No. 160,780, but which is illustrated herein for the sake of clarity. Two screwed members 22 carry a frame member 23 in which is slidably mounted a wedge-shaped member 24 carrying the stops 19. Journalled in the frame member 23 is a screw-threaded shaft 25 cooperating with a nut member 26 connected with a second wedge member 27 complementary to and engaging the first wedge member 24 and abutting a back plate 28. Fine adjustment of the position of the stops 19 for any given setting of the frame member 23 by the hand wheel 21 can be obtained by rotating the shaft 25 to cause the wedge member 27 to cause or permit movement of the wedge member 24 relatively to the frame member 23. An A.C. servo driving mechanism indicated generally at 29 is carried on the frame member 23 and is coupled to one end of the shaft 25. The mechanism 29 includes an A.C. servo motor 30, an A.C. tachometer 31, and a reduction gear unit 32. A torque limiting coupling 33 may be included. Also carried by the frame member 23 is a positional feed back potentiometer 34. The dough divider is also provided with a setting potentiometer 35 coupled with hand wheel 21.

A lamp 36 directs a beam of light across the path of dough pieces a little prior to the weighing head 14 and on to a photoelectric cell 37, such that the beam of light falling on the cell 37 is interrupted with the passage of each dough piece. Reject mechanism 16 is operated through an amplifier 38.

When the apparatus is in operation and dough pieces are delivered by the dough divider 10, as each dough piece approaches the weighing head 14, photoelectric cell 37 sends a signal on line 39 to control means 40. Each dough piece is weighed at the weighing head 14 and an error signal indicative of the extent and magnitude of variation of the weight of the dough piece from a predetermined weight is delivered to the control means 40 on line 41. If the dough piece should be underweight a signal is sent on line 42 to amplifier and relay 38 which also includes a time delay to bring about operation of the reject mechanism 16 at the time when the dough piece in question reaches the reject station 15. The control means 40 includes a ring counter responsive to signals from the photoelectric cell 37 and error signals on line 41 are accumulated by integrating means, as will be hereinafter described, until the ring counter has reached a predetermined count, whereupon an output signal indicative of the integrated error of the predetermined number of dough pieces is applied to a D.C. servo system driving storage means.

Such storage means is illustrated in FIG. 4. A D.C. servo motor driving mechanism 43 is coupled to a shaft 44 carrying a pair of gear wheels 45 meshing with gear wheel 46 on shaft 47 and with gear wheel 48 on shaft 49, the two gear wheels 45 being adjusted relatively to one another substantially obviate backlash.

Shaft 44 also carries one element of a magnetic clutch 50 leading to one end of a drive shaft of helical potentiometer 51, the other end of whose shaft is connected to an electromagnetic brake 52 for locking the shaft in position. Shafts 47 and 49 are similarly couplable through magnetic clutches 53, 54, to drive shafts of potentiometers 55, 56, with which are similarly associated brakes 57, 58. The drive mechanism 43 includes a D.C. servo motor 59, a D.C. tachometer 60 and a reduction gear unit 61. At this time the magnetic clutches 50 and 54 are energized and brakes 52 and 58 disconnected. The servo motor 59 rotates the two potentiometers 51 and 56 until the voltage signal derived from potentiometer 51 is substantially equal to the integrated error signal. The signal derived from the potentiometer 56 is applied by the control means 40 to the A.C. servo motor 30 which now operates until a corresponding signal is derived from the potentiometer 34. Operation of the motor 30 provides a correcting adjustment to the position of the stops 19 in the dough divider.

The magnetic clutch 54 is released and the brake 58 operated to lock the shaft of the potentiometer 56 and thus store the correction applied. The output signal from the integrating means is disconnected and servo motor 59 drives the potentiometer 51 back until it balances the absence of output signal. The clutch 50 is disengaged and the brake 52 engaged to hold the potentiometer 51 locked. The magnetic clutch 53 is now engaged and the brake 57 released. The integrating means is converted into a "leaky" integrator and the output of the integrating means is reapplied to the D.C. servo motor which drives the potentiometer 55 to reset zero of the integrating means and thereby compensate for any drift, as will be hereinafter described.

Meanwhile whilst further dough pieces have been past weighing head 14, the photoelectric cell 37 has passed further signals to the ring counter and when the counter has reached a second predetermined count, conveniently 5, but determined by the number of dough pieces in transit between the dough divider 10 and the weighing head 14, the output of the integrating means is disconnected from the servo motor 59 and signals from the weighing head are reapplied thereto and the cycle repeated.

The circuitry and its operation will be described in greater detail with reference to FIGS. 3, 5, 6, 7 and 8.

Figure 3A:
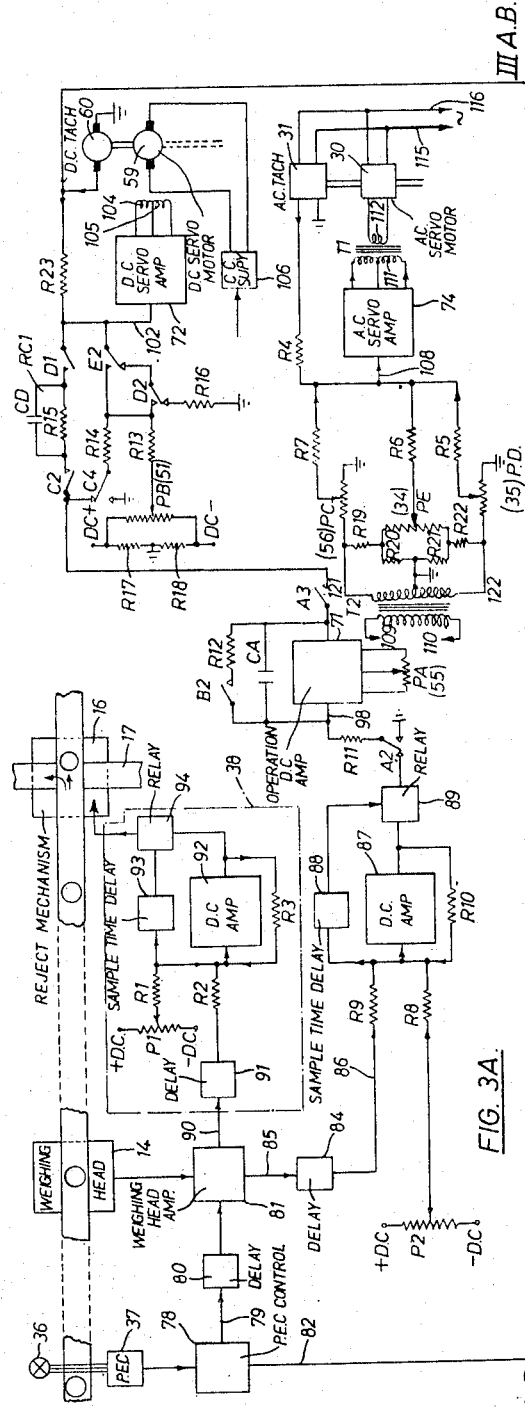
FIG. 3 (A and B) is a circuit diagram partly in block form.
Figure 5:
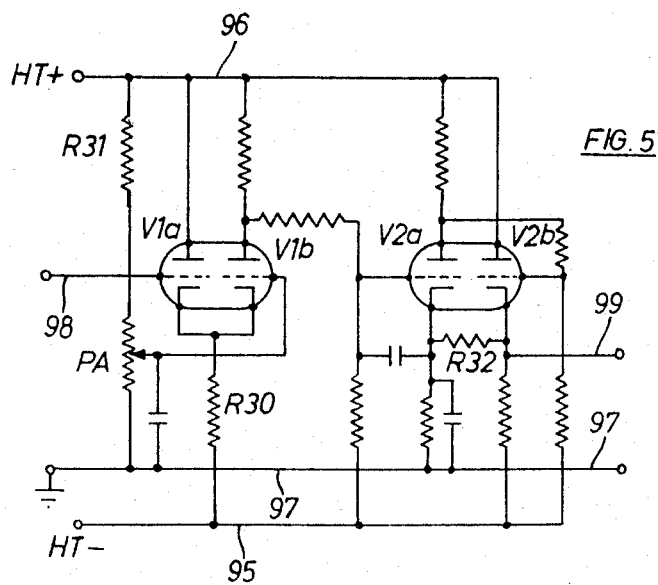
FIG. 5 is a circuit diagram of the operational D.C. amplifier of FIG. 3.

In FIG. 3 the PA represents the potentiometer 55, PB represents the potentiometer 51, PC represents the potentiometer 56, PD represents potentiometer 35 and PE potentiometer 34. The operating windings of the electromagnetic clutches 53, 50, 54, are indicated at CA, CB, CC respectively and the operating coils of the brakes 57, 52, 58 at BA, BB, BC respectively. The ring counter 70 includes 15 stages. Associated with the 9th stage 70(9) is a monostable multivibrator 75 controlling the operating coils of two relays designated F and G. Associated with the 10th stage 70(10) is a second monostable multivibrator 76 controlling coils of two further relays designated A and E. Associated with the 15th stage 70(15) is a third monostable multivibrator 77 controlling the coil of a further relay designated M. 73 denotes a steady state detection amplifier which is associated with the D.C. tachometer 60 and includes the operating coil of a high speed relay designated H. Contacts D4, G2 and F2 of relays D, G and F respectively are associated with the operating coils of the electromagnetic clutches and brakes.

Since initially all relays are released contacts D4, G2 and F2 complete circuits for coils BA, BB, BC of the three brakes so that the three potentiometers 55, 51 and 56 are locked. As the first dough piece interrupts the beam of light falling from lamp 36 on to photoelectric cell 37, a signal is passed to control amplifier 78 where it is amplified and two control signals are passed, one on line 79 through a delay 80 to a weighing amplifier 81 and the other on line 82 through a pulse shaper and delay network 83 to the ring counter 70. The stages of the ring counter 20 are stepped by the pulses from the pulse shaper 83 and when any one stage is triggered, it conditions the succeeding stage to be triggered by the next pulse and also resets the preceding stage. The first pulse from pulse shaper 83 triggers first stage 70(1) of the ring counter.

Whilst the weighing head may be of any known type, that illustrated by way of example is of a known type in which the current through a moving coil displaceable under the weight of an article to be weighed, is varied in order to return the coil to a given position after having been displaced therefrom by the weight of an article, the displacement of the coil from said given position being detected photoelectrically. The signal applied to the weighing head 81 through the delay 80 allows sufficient time for the dough piece to reach the weighing head before a platform on which the dough piece is to be weighed rises to receive it. In order to allow for some oscillation of the moving coil and platform before settling down to a steady state, a further time delay device 84 in the form of two one-shot monostable cathode coupled multivibrators is inserted in an output lead 85 and is triggered off by an initial output signal from the weighing head 14, which output signal is derived from a high stability resistor in the circuit of the moving coil.

An output signal indicative of a steady state and the magnitude of the weight of the dough piece is passed on lead 86 to the input of a high gain D.C. amplifier 87 through input resistor R9. The D.C. amplifier 87 includes a feed back resistor R110 which is substantially equal to the input resistor R9 so that the amplifier has an overall gain of approximately unity but of high input and low output impedance. A signal is derived from a weight reference potentiometer P2 and is also fed through resistor R8 to the input of the amplifier 87 and provides a signal corresponding to that which would be provided on lead 86 by a dough piece of desired weight. The output of the amplifier 87 is an analogue of the difference in the weight of the dough piece from the desired weight as set by potentiometer P2 and the sign and amplitude of the signal represents the magnitude and direction of the deviation of the weight of the dough piece from the desired weight.

The leading edge of the pulse applied to lead 86 also triggers off a further time delay device 88 which may also be in the form of two one-shot monostable cathode coupled multivibrators which controls a relay 89 connected between the output of the amplifier 87 and normally closed contacts A2 of relay A. The purpose of the time delay device 88 and relay 89 is to determine the length of time for which the output of the amplifier 87 is applied to relay contact A2 and thence through input resistor R11 to a operational D.C. amplifier 71.

The weighing head amplifier 81 also provides an output signal on lead 90 by which it is extended through a time delay device 91 similar to the time delay device 84 to a high gain D.C. amplifier 92 through an input resistor R2 which is substantially equal to a feedback resistor R3. Also connected to the input of the amplifier 92 through resistor R1 is a signal derived from potentiometer P1 and corresponding to the minimum permissible weight of dough sample. A sample time delay device 93 conditions a polarized relay 94 responsive to the output from the amplifier 92. If the weight of the dough piece is less than the minimum weight to which the signal from potentiometer P1 corresponds the polarized relay 94 will respond to the output signal from the amplifier 92 and cause reject mechanism 16 to segregate the dough piece on to the reject conveyor 17. It will be appreciated that a time delay device must be incorporated in the reject mechanism 16 in order to allow the appropriate time for the dough piece to be released by the weighing head and travel to the release station.

Referring once more to the output signal from the D.C. amplifier 87 which is indicative of the deviation of the weight of the dough piece from the desired value, it is applied through contacts A2 and resistor R11 to the input of the operational D.C. amplifier 71. The amplifier 71 is provided with feedback capacitor CA which converts it into an integrator. One form of amplifier 71 is illustrated in the circuit diagram of FIG. 5 and comprises a twin triode V1a, V1b connected as a long tailed pair. Both cathodes are connected through resistor R30 to an HT negative line 95 whilst anode of triode of V1a is connected to an HT line 96. A centre tap of the HT supply on lines 95, 96 is connected to an earth line 97. An input signal on line 98 is applied to the grid of triode V1a, whilst a zero set signal is applied to the grid of triode V1b from potentiometer PA which is connected in series with resistor R31 between the HT line 96 and earth. A second double triode V2a, V2b, is connected as a conventional two-stage amplifier with feed back provided by resistor R32 connected between the cathode of V2b and the cathode of V2a. An output signal is delivered between line 99 and the earth line 97 and may be positive or negative with respect to the earth line 97. The capacitor CA in FIG. 3 is connected between leads 99 and 98.

As each dough piece interrupts the beam of light from the lamp 36 and is received at the weighing station the ring counter 70 is stepped and a signal as an analogue of the deviation of the weight of each dough piece from the desired weight is impressed for a predetermined length of time upon the input lead 98 of the D.C. amplifier 71. When the 9th dough piece arrives at the weighing station, the 9th stage 70(9) of the ring counter 70 is triggered and through lead 100 triggers the monostable multivibrator 75 to complete a circuit for the coils of relays G and F both of which operate. Contacts G1 provide a holding circuit for relay G through normally closed contacts K1, and contacts F1 provide a holding circuit for relay F through normally closed contacts J1. Contacts G2 disconnect the coil BB of the brake 52 and complete a circuit for the coil CB of the clutch 50, whilst contacts F2 similarly disconnect the coil BC and connect the coil CC so that potentiometers 51 and 56 are unlocked and are coupled to shaft 44 directly or through shaft 49 and gears 48, 45.

On arrival of the 10th dough piece the tenth stage 70(10) of the ring counter is triggered after a time delay introduced by the network 83 of sufficient duration to ensure that the stage is not triggered before the relay 89 has operated. Through line 101 the tenth stage 70(10) triggers monostable multivibrator 76 to complete a circuit for the coils of relays A and E both of which operate. Contacts A1 provide a holding circuit for relay A through normally closed contacts M2 whilst contacts E1 in series with normally open contacts G3 now closed, provide a holding circuit for relay E. Contacts A2 disconnect the output from the amplifier 87 to the input lead 98 of the amplifier 71 and contacts A3 extend the output of the amplifier 71 through contacts C4 and resistor R14 and change-over contacts E2 of relay E, now operated, to input lead 102 of the D.C. servo amplifier 72. Contacts E3 are ineffective at this stage but contacts E4 prepare a circuit for the operation of relay J. Relays J, K and L are each slow operating relays and through contacts E4 initially complete a circuit through contacts H1, relay J does not operate before relay H operates to change over its contacts H1. The output of the amplifier 71 is applied to the input of the servo amplifier 72 to which there is also applied a signal from potentiometer PB through resistor R13 and contacts E2. The servo amplifier 72 compares the output of the amplifier 71 with the signal from the potentiometer PB and delivers an output signal to the DC servo motor 59 to drive the potentiometer PB through the clutch 50 until the voltage across the potentiometer PB is substantially equal to the output voltage of the amplifier 71 which has functioned as an integrator. As soon as the servo motor 59 commences to rotate the D.C. tachometer 60 coupled thereto produces a signal which is fed back to the input lead 102 of the servo amplifier 72 through resistor R23 as a stabilizing signal and is also fed through lead 103 to the steady state amplifier 73 to bring about operation of high speed relay H.

As soon as the D.C. servo motor 59 has reached a steady state, there will be no signal delivered by the D.C. tachometer 60 and relay H will release for a sufficient length of time for relay J to operate through contacts H1 and E4.

Figure 6:
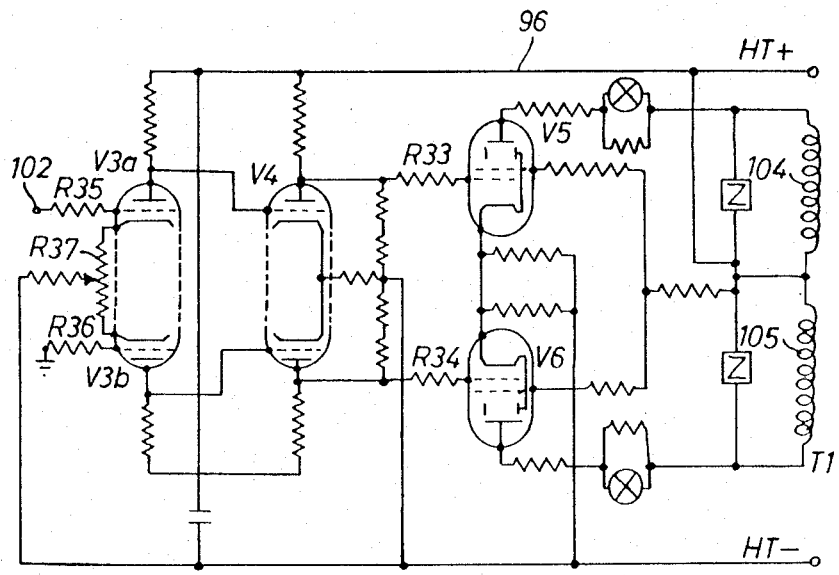
FIG. 6 is a circuit diagram of the D.C. servo amplifier of FIG. 3.

One form of D.C. servo amplifier 72 is illustrated in FIG. 6 and comprises a twin triode input stage V3a, V3b directly coupled to a twin triode second stage V4a, V4b, the anodes of which are directly coupled through grid resistors R33, R34, to a pair of beam tetrodes V5, V6, whose anodes are connected to an HT supply on line 96 through two opposed field windings 104, 105 of the D.C. servo motor 59. Signals on the input lead 102 are applied through grid resistor 35 to the control grid of triode V3a whilst the control grid of the other input triode V3b is connected to earth thruogh resistor R6. Balance between the two channels in the amplifier 72 is attained by adjustment of a potentiometer R37 in the circuit of the cathodes of the two triodes V3a, V3b.

When a positive signal is applied to lead 102 the current passing through field winding 104 is greater than that passing through the field winding 105. If a negative signal is applied to the input lead 102 current passing through the field winding 105 is greater than that passing through field winding 104, so that the DC servo motor whose armature is supplied with a substantially constant current D.C. supply by a supply unit 106, rotates in one direction or the other according to the direction of the potential applied to input lead 102.

When relay D operated contacts D3 prepared a circuit for relay L, which operated upon operation of relay H. Contacts L1 disconnect a feedback path from the fifteenth stage 70(15) of the ring counter 70 back to the first stage 70(1) in order to prevent the ring counter from commencing to count afresh until the apparatus has been re-set. Contacts L2 complete an alternative holding circuit for the coil of relay A against the operation of relay M, and contacts L3 prepare a holding circuit for relay M. When the fifteenth stage 70(15) of the ring counter 70 is triggered, it triggers a monostable multivibrator 77 which provides an operating circuit for relay M. If at this time the adjustment of the potentiometer PA has not been completed, relay H will be operated and so will relay L; contacts L3 provide a holding circuit with relay M and contacts L2 for relay A. As soon as the adjustment has been completed and a steady stage reached, relay H is released and through contacts H1 releases relay L. Contacts L1 prepare the ring counter for triggering the first stage 70(1) to the next pulse from pulse shaper 83. Upon operation of relay M contacts M2 interrupt the holding circuit for relay A which releases. The opening of contacts A4 releases relays B and C. The release of relay C releases relay D. With relays A, B, C and D released the output of D.C. amplifier 87 is reconnected to the input lead 98 of the input amplifier 71 and the output thereof is disconnected from the input to the servo amplifier 72 by contacts A3. Contacts B2 disconnect resistor R12 from across capacitor CA and the amplifier 71 can now function as an integrator as previously described. The cycle of operations can now be repeated.

It will be appreciated that the amplifier 71, in conjunction with the capacitor CA integrated the error signals in respect of the ten dough pieces and then applied through the D.C. servo amplifier 72 appropriate signals to the D.C. servo motor 59 to adjust the potentiometer PC to which the A.C. servo amplifier 74 responded. Thereafter the potentiometer PB was reset to zero, the charge on the capacitor CA dissipated and the setting of the D.C. amplifier 71 adjusted in order to counter any drift. Allowance was made for at least five dough pieces to pass through the weighing head and only thereafter the amplifier 71 commenced to operate again as an integrator and determine the average weight error in the ten dough pieces, whereafter any further correction would be effected.

The steady state detection amplifier 73 is illustrated in greater detail in FIG. 7 and comprises four triodes V7, V8, V9, V10 connected as a conventional high gain D.C. amplifier with a cathode follower output stage. Triodes V7 and V8 have a common cathode resistor R38 and a feedback signal from cathode resistor R39 of the output triode V10 by a variable potential divider formed by resistors R40 and R41 is applied to the grid of the triode V8 to provide stabilizing negative feedback. The coil of the high speed relay H is connected between earth and the cathode of output triode V10 and is protected from overvoltage by a voltage limiting network 107. Connected between input line 103 and the control grid of the triode V7 is a resistor capacitor network CR, which serves to add to the input signal its first derivative. As soon as the D.C. tachometer 60 rotates, an input signal is delivered on lead 103 and relay H operates.

The D.C. servo motor 59 in addition to driving the potentiometer 51 also drives the potentiometer 56 through clutch 54. Any movement of the potentiometer 56, denoted as PC in FIG. 3, constitutes a disturbance to the A.C. servo amplifier 74 to the input lead 108 of which a plurality of signals are applied. The A.C. servo amplifier 74 compares the signal from potentiometer PC with the signal from potentiometer PE and potentiometer PD. The potentiometer PD is associated with the hand wheel 21 for operating the screw and nut mechanism and thus presents a signal corresponding to the coarse adjustment of the divider stops 19. The potentiometer PE is connected to the screw member 25 of the wedge adjusting mechanism for the stops and provides a signal indicative of the position of the nut 26 along the screw member 25. As the range of adjustment provided by the wedge mechanism is but a fraction of the total range of adjustment of the position of the stops as provided by the screw and nut mechanisms, the potentiometer PE is arranged in a potentially divided bridge network formed by resistors R19, R20, R21 and R22, the common point of resistors R20 and R21 being connected to earth, and to the centre tapped secondary winding of transformer T2. The transformer T2 provides an A.C. supply for the bridge network through leads 122 and 123 and antiphased supplies to potentiometers PC and PD the other ends of these being earthed. The inputs from the three potentiometers PC, PD and PE are connected to the input line 108 through resistors R5, R6, R7 and the primary of transformer T2 is connected to an A.C. supply on leads 109, 110.

The A.C. servo amplifier is illustrated in greater detail in FIG. 8 and comprises a push-pull amplifier embodying a twin triode input valve V11a, V11b, twin triode (driver) stage V12, and a push-pull output stage, including two pentodes V13, V14. An input signal is applied to the control grid of V11a. A signal drawn from the anode is fed to the control grid of one triode V12a whilst another signal is derived from potential divider R42, R43 and applied through grid resistor R44 to the control grid of triode V11b, from the anode of which a signal is applied to the control grid of triode V12b. The divider stage operates in push-pull and drives the output pentodes V13, V14 in a conventional manner. The anodes of the output stage are connected to an HT supply on line 96 through centre tapped primary winding 111 of an output transformer T1 whose secondary winding 112 is connected to one field winding 113 of the A.C. servo motor 30 which is in the form of a two-phase motor, having a second field winding 144 which is connected to an A.C. supply on lines 115, 116. The A.C. servo amplifier provides a phase shift between signals on the control grid of valve V11a and the output transformer, and a further phase shift network 120 between the control grid and the input lead 108 ensures that output signals delivered to the field winding 113 are substantially in quadrature with the supply applied to the field winding 114. The phase of the disturbance on the input lead 108 determines the phase of the output signal in the field winding 113 and thereby the direction of rotation of the A.C. servo motor, the direction being such as to reduce the disturbance on the input lead towards zero. For stabilization an A.C. tachometer 31 is coupled to the A.C. servo motor 30 and provides a signal to the input lead 108 through resistor R4.

Rotation of the servo motor 30 drives the screw member 25 to move the nut and thereby the wedge member 27 in the appropriate direction to drive stops 19 in or permit them to move out. Movement of the stops 19 modifies the volumetric size of the dough pieces delivered by the dough divider 10 and corrects any average deviation in weigh of a number of dough pieces, in this case 10, from the desired value.

When relay J is operated contacts J1 interrupt the holding circuit for relay F which then releases whilst contacts J2 and J3, prepare circuits for operation for relays B and C whose operating circuits are completed by contacts F3 upon release of relay F. Contacts F2 disconnect coil CC and reconnect coil BC so that the magnetic clutch 54 is disconnected and the brake 58 operated to lock potentiometer 56. The potentiometer 51, however, remains coupled to the shaft 44. On operation of relay B contacts B1 provide a holding circuit for relay B through contact A4 and contacts B2 connect resistor R12 in parallel with capacitor CA and convert the amplifier 71 which has previously been functioning as an integrator into a leaky integrator and effectively discharge capacitor CA. Upon operation of relay C, contacts C1 provide a holding circuit through contacts A4, contacts C3 are ineffective, and though contacts C5, complete a circuit to the coil of relay K, that relay which is slow to operate does not operate before relay H interrupts the operating circuit at contacts H1. Contacts C4 apply earth to the input lead 102 of the servo amplifier 72 which then compares the earth with the signal provided by the potentiometer PB and drives the D.C. servo motor 59 to restore the potentiometer PB to a position in which it provides a signal corresponding to earth potential thereby offsetting any drift in the amplifier 72. Upon rotation of the servo motor 59 the tachometer 60 provides a signal on lead 103 and relay H operates. As soon as a steady state has been reached relay H releases and, after a short time delay, relay K operates through contacts C5 now closed. Contacts K1 interrupt the holding circuit for relay G which then releases and contacts G2 disconnect coil CB and reconnect coil BB to lock potentiometer 51 which has now been returned to a zero setting. Contacts E3 complete an operating circuit for the coil of relay D. Contacts E4 disconnect the coil of relay J which releases. A circuit is now completed from the output lead of the amplifier 71 through contacts A3, C2, phase-shifting resistor capacitance network formed by capacitor CD and resistor R15, contacts D1 to the input lead 102 of the servo amplifier 72 to which there is also applied earth through contacts C4, resistor R14, contacts D2 and E2 and signal from the D.C. tachometer 60 through resistor R23. The servo amplifier 72 now compares the signal on the output of the D.C. amplifier 71 with earth and drives the D.C. servo motor 59 to rotate the potentiometer 55 in FIG. 4 and shown as PA in FIG. 3, to correct any drift in the D.C. amplifier 71, the operation of the relay D having, through contacts D4, disconnected coil BA and connected coil CA to release the brake 57 and operate the clutch 53 to connect to potentiometer 55 through shaft 47, gears 46 and 45 to shaft 44.

The ring counter 70 may comprise a plurality of bistable multivibrators but other forms of counting means may readily be employed. For example it may comprise two or more counting tubes such as dekatrons and in such an arrangement one dekatron could be employed to count up to ten and provide a signal for operating the monostable multivibrators 75 and 76 at a count of nine and ten respectively, whilst the second dekatron could be used to count the additional stages after ten. This arrangement has some advantages in that it is possible to vary at will the number of additional stages after ten should the number of dough pieces in transit between the dough divider and the weighing station be greater or less than five. Yet again the ring counter could be in the form of a shaft driven mechanically from a shaft of the dough divider through any suitable gearing and provided with one or more cams associated cam followers and micro switches. Yet again an electromagnetically operated stepping switch, such as a uniselector, could serve as the ring counter 70.

Transistor switching circuits may be employed in place of some of the relays for example those controlling the electromagnetic brakes and clutches associated with the potentiometers PA, PB, PC.

In an alternative arrangement the amplifier and relay unit 38 associated with the lightweight reject mechanism is dispensed with and the output from the amplifier 87 through relay 89 is applied to a biassed polarized relay which controls the reject mechanism 16. Since, as has hereinbefore been explained, the lightweight reject value of weight of a dough piece differs from the desired weight of the dough pieces, the coil of the polarized relay is suitably biassed to compensate for this: an output signal from the amplifier 87 proportional in size and magnitude to the error in weight of a dough piece is passed to the input lead of the amplifier 71 through contact A2 as hereinbefore described, and is also applied to the polarized relay which operates if the output signal is indicative that the weight of a dough piece is below the desired lightweight limit.

I claim:

1. An error correcting system comprising integrating means responsive to a predetermined number of successive error signals each indicative of the degree and direction of departure of selected characteristics of a unit or package from a predetermined desired value and providing an integrated output signal determined by the sum of said error signals, a storage means, a first servo mechanism responsive to said integrated output signal for driving said storage means and a second servo mechanism adapted to be connected to apparatus to be controlled and responsive to said storage means for effecting an error correcting adjustment of said apparatus.

2. An error correcting system for quantitatively controlling operation of a dough divider dividing dough into pieces, comprising integrating means responsive to a predetermined number of successive error signals, each indicative of the degree and direction of departure of the weight of a dough piece from a predetermined value, and providing an integrated output signal determined by the sum of said error signals, a storage means, a first servo mechanism responsive to said output signal for driving said storage means and a second servo mechanism adapted to be connected to said dough divider and responsive to said storage means for effecting an error correcting adjustment of said dough divider.

3. An error correcting system for controlling the manufacture of articles by a machine such as a divider from which pieces are delivered and conveyed in succession along a given path and are each individually tested at a testing station, comprising integrating means responsive to a predetermined number of successive error signals each indicative of the degree and direction of departure of a selected characteristic of an article from a predetermined value when tested at said testing station, and providing an integrated output signal determined by the sum of said error signals, storage means, a servo mechanism responsive to said integrated output signal for driving said storage means, and an alternating servo current mechanism adapted to be connected to said machine and responsive to said storage means for effecting an error correcting adjustment of said machine.

4. A system as claimed in claim 3, including means located in advance of said testing station for deriving a signal responsive to the passage of each article along said given path, counting means responsive to said signals and delivering a first count output signal and a second count output signal, control means responsive to said first count output signal for coupling said firstmentioned servo mechanism to the output of said integrating means for driving the said storage means and interrupting the feed of error signals of said integrating means, means responsive to the termination of the resultant operation of said firstmentioned servo mechanism for disconnecting said firstmentioned servo mechanism from said storage means and resetting said integrating means, and control means responsive to said second count output signal for reestablishing the feed of error signals to said integrating means after it has been reset.

5. In a manufacturing process wherein a succession of individual articles are divided from a bulk supply in a divider having adjustment means controlling a selected parameter of the individual articles, an error correcting system comprising means for measuring the selected parameter of each individual article in succession and delivering a series of electrical error signals each indicative of the degree and direction of departure of that parameter of an article from a predetermined desired value, integrating means responsive to a predetermined number of successive error signals and providing an output signal corresponding to the sum of said predetermined number of successive error signals, storage means, a first servo mechanism responsive to said output signal for driving said storage means, and an alternating current servo mechanism connected to said adjustment means and responsive to said storage means for effecting an error correcting adjustment of said adjustment means.

6. In a manufacturing process wherein a succession of individual articles is divided from a bulk supply in a divider having adjustment means controlling one parameter of the individual articles, an error correcting system comprising means for measuring said one parameter of each individual article in succession, and delivering a series of electrical error signals each indicative of the degree and direction of departure of that parameter of an article from a predetermined desired value, integrating means responsive to a predetermined number of successive error signals and providing an output signal corresponding to the sum of said predetermined number of successive error signals, storage means, a first servo mechanism responsive to said output signal for driving said storage means, and an alternating current servo mechanism connected to said adjustment means and responsive to said storage means for effecting an error correcting adjustment of said adjustment means.

7. In the manufacture of bread, wherein a succession of individual dough pieces are divided from a bulk supply in a dough divider having adjustment means controlling the volume of individual dough pieces, an error correcting system comprising means for weighing each individual dough piece and delivering a series of electrical error signals indicative of the degree and direction of departure of the weight of each dough piece from a predetermined desired weight, integrating means responsive to a predetermined number of successive error signals and providing an output signal corresponding to the sum of a predetermined number of successive error signals, storage means, a first servo mechanism responsive to said output signal for driving said storage means, an alternating current and servo mechanism connected to said adjustment means and responsive to said storage means for effecting an error correcting adjustment of said adjustment means.

8. In a manufacturing process wherein a succession of individual articles is produced from a bulk supply by apparatus having adjustment means controlling a parameter of individual articles, and are delivered therefrom in succession to a testing station wherein a selected parameter of each individual article is measured, an error correcting system comprising means responsive to the passage of each article to said testing station for producing a series of pulses each indicative of a passage of an individual article, counting means responsive to said pulses and delivering a first count signal when one predetermined number has been reached and a second count signal when a second predetermined number has been reached, integrating means, means for feeding to said integrating means a succession of error signals derived from measuring means at said testing station and each indicative of the degree and direction of departure of a selected parameter of each article from a predetermined desired value, storage means, a first servo mechanism for driving said storage means, switch means responsive to said first count signal for extending from said integrating means to said servo mechanism an output signal corresponding to the sum of said first predetermined number of said error signals for causing said first servo mechanism to drive said storage means, an alternating current servo mechanism connected to said adjustment means and responsive to said storage means for effecting an error correcting adjustment of said error adjustment means, switching means responsive to the reestablishment of steady state conditions in said first servo mechanism for disconnecting said output signal from said first servo mechanism and interrupting the feed of error signals to said integrating means and disconnecting said first servo mechanism from said storage means, and thereafter resetting said integrating means, switch means responsive to said second count signal for reestablishing the feed of said error signals to said integrating means and switch means responsive to a further count signal from said connecting means when a number one less than said one predetermined number has been reached for reconnecting said first servo mechanism to said storage means.

9. An error correcting system for quantitatively controlling operation of a dough divider dividing dough in bulk into individual dough pieces and delivering them in succession along a given path including a weighing station, comprising pulse generating means responsive to the passage of individual dough pieces to the weighing station, means at said weighing station for weighing each individual dough piece and delivering a series of electrical error signals indicative of the degree and direction of departure of the weight of each dough piece from a predetermined desired value, counting means responsive to said pulses and delivering a first count output signal when a first predetermined number has been reached and a second count output signal when a second predetermined number has been reached, integrating means for providing an output signal corresponding to the sum of said first predetermined number of successive error signals, first switch means controlling the feeding of said errior signals to said integrating means, a first servo mechanism, position-responsive means for said first servo mechanism, storage means, drift correcting means for said integrating means, means for selectively coupling each of said storage means, poition responsive means and drift correcting means to said servo mechanism and for disconnecting them therefrom and locking them, means responsive to movement of said first servo mechanism, second switch means responsive to an output signal from said counting means when a count one less than said first predetermined number has been reached for unlocking said storage means and said position-responsive means and connecting them to said first servo mechanism, third switch means responsive to said first count output signal for connecting said output signal from said integrating means to said first servo mechanism and for operating said first switch means to disconnect said error signals from said integrating means, fourth switch means responsive to said movement responsive means when resultant movement of said first servo mechanism has substantially ceased for disconnecting said storage means from said first servo mechanism and locking said storage means and for disconnecting said output signal from said first servo mechanism and connecting a zero signal in place thereof to cause said first servo mechanism to drive said position-responsive means to a position corresponding to said zero signal and for resetting said integrating means, fifth switch means responsive to said movement-responsive means when resultant movement of said first servo mechanism has substantially ceased for disconnecting said position responsive means from said first servo mechanism and locking said position responsive means and for unlocking said drift correcting means and connecting it to said first servo mechanism for correcting any drift in said integrating means, sixth switch means responsive to said movement responsive means when any resultant movement of said first servo mechanism has substantially ceased for restraining the resetting of said counting means thereuntil, seventh switch means responsive to said second count output signal for disconnecting said drift correcting means from said first servo mechanism and locking said drift correcting means and causing said first switch means to re-establish feed of error signals to said integrating means, and a second servo mechanism adapted to be connected to said adjustment means and responsive to said storage means for effecting error correcting adjustment of said adjustment means.

10. A system as claimed in claim 9 in which said integrating means is a direct current amplifier with a capacitor connecting its output to its input.

11. A system as claimed in claim 9 in which said first servo mechanism comprises a direct current amplifier and a direct current motor having opposed field windings and an armature, means for connecting the field windings to the output of the amplifier and the armature to a direct current supply.

12. A system as claimed in claim 9 in which each of said storage means, said position-responsive means and said drift correcting means are potentiometers.

13. A system as claimed in claim 9 including electromagnetic clutches for connecting each of said storage means, said position responsive means and said drift correcting means to said first servo mechanism by electromagnetic clutches.

14. A system as claimed in claim 9 including electromagnetic brakes for locking each of said storage means, said position-responsive means and said drift correcting means.

15. A system as claimed in claim 9 in which said movement-responsive means comprises a direct current tachometer and an electromagnetic relay responsive to the output thereof.

16. A system as claimed in claim 9 in which said second servo mechanism comprises an alternating current servo motor coupled to said adjustment means and having two field windings in quadrature, means for connecting one of said field windings to an alternating current electricity supply, an alternating current servo amplifier means for connecting the output of said amplifier to the other of said field windings to provide an output in quadrature with the supply connected to said one of said field windings, a position responsive potentiometer mechanically coupled to said adjustment means, said storage means comprising a potentiometer, means for connecting said potentiometer to an alternating current supply and means for connecting sliders of said potentiometers to the input of said alternating current servo amplifier.

17. A system as claimed in claim 16 in which said second servo mechanism includes an alternating current tachometer and means for connecting the output of said alternating current tachometer to the input of said alternating current servo amplifier.

18. A system as claimed in claim 9 in which said first predetermined number is ten.

19. A system as claimed in claim 9 in which said second predetermined number is fifteen.

20. A system as claimed in claim 9 in which said counting means is a multiunit ring chain.

21. A system as claimed in claim 9 including means responsive to said error signals for rejecting any dough piece below a predetermined minimum weight.

References Cited by the Examiner
UNITED STATES PATENTS

| | | | |
|---|---|---|---|
| 2,688,459 | 9/1954 | Merrill | 235—151 |
| 2,722,640 | 11/1955 | Merrill | 328—148 |

MALCOLM A. MORRISON, *Primary Examiner.*

K. W. DOBYNS, *Assistant Examiner.*